United States Patent [19]
Iddings

[11] Patent Number: 5,117,143
[45] Date of Patent: May 26, 1992

[54] ANTI-WINDMILLING MOTOR

[75] Inventor: Franklin G. Iddings, Albion, Ind.

[73] Assignee: Electric Motors and Specialities, Inc., Garrett, Ind.

[21] Appl. No.: 673,672

[22] Filed: Mar. 22, 1991

[51] Int. Cl.⁵ .............................................. H02K 7/10
[52] U.S. Cl. ..................................... 310/191; 310/77
[58] Field of Search ................ 310/191, 41, 90, 261, 310/263, 257, 77; 188/82.1, 82.74, 82.2

[56] References Cited

U.S. PATENT DOCUMENTS

| | | | |
|---|---|---|---|
| 3,501,656 | 3/1970 | Morley | 310/41 |
| 3,809,932 | 5/1974 | Erwin | 310/41 |
| 3,821,567 | 6/1974 | Erwin | 310/41 |
| 3,826,934 | 7/1974 | Leach | 310/41 |
| 3,860,841 | 1/1975 | Jullien-Davin | 310/41 |
| 4,716,325 | 12/1987 | Roos | 310/41 |
| 5,070,266 | 12/1991 | Janczak et al. | 310/77 |

Primary Examiner—Steven L. Stephan
Assistant Examiner—E. To
Attorney, Agent, or Firm—Pearne, Gordon, McCoy & Granger

[57] ABSTRACT

An electric motor having a design rotational direction when electrically energized and an anti-rotation mechanism to prevent reverse rotation due to external loads when the motor is de-energized which reverse direction could otherwise continue when the motor is energized. The mechanism includes elements that are displaced from contact with one another when upon energization the rotor assumes a magnetic center relative to the stator and that interengage to prevent reverse rotation upon motor de-energization and displacement of the rotor from the magnetic center position.

7 Claims, 2 Drawing Sheets

ANTI-WINDMILLING MOTOR

BACKGROUND OF THE INVENTION

The invention relates to electric motors and, in particular, to motor constructions which have a preferred direction of rotation and are prevented from rotation in an opposite direction.

Electric motors of certain types such as single phase motors of the permanent split capacitor type may have a tendency when electrically energized to maintain the direction of rotation that they have before energization. Fans, impellers, pumps and other machine elements may have a tendency to back drive or windmill a motor in a direction opposite that for which it was designed. Thus, when the back driven motor is electrically energized, it continues to rotate in the wrong direction.

U.S. Pat. Nos. 3,821,567 and 4,716,325, for example, show mechanisms that ensure that a motor operates from a start-up in a preferred direction. The first of these patents relies on axial displacement of a rotor when rotation occurs in the wrong direction; it has the potential for malfunction because it relies on a differential in frictional forces that may be adversely affected by dirt, moisture, or other environmental conditions. The second of these patents has a displaceable arm that can block rotor rotation in the wrong direction. The arm requires some type of separate electrical actuation and, therefore, can add significantly to the complexity and cost of the motor.

SUMMARY OF THE INVENTION

The invention provides a simple mechanical lock that prevents a motor from free-wheeling in a wrong direction so that the risk that the motor will continue to rotate in the wrong direction once energized is eliminated. As disclosed, the free-wheeling lock is engaged and disengaged by limited axial motion of the rotor shaft. Axial motion of the rotor shaft can be developed, advantageously, by the magnetic centering forces of the field winding on the rotor. Such centering force causes the rotor to seek a position where the free-wheeling lock is inoperative and allows normal operation. During periods when the motor is not electrically energized, external forces on the motor shaft are effective to move the motor shaft to a position where the free-wheeling lock is operative.

A locking pawl of the free-wheeling lock is mounted on the stator in a position to engage a catch surface on the rotor when the rotor is moved to the non-operating axial position. The pawl is arranged to disengage the rotor carried catch surface when the motor is electrically energized and the rotor assumes its axially centered position.

Thus, in accordance with the invention, advantage is taken of the natural tendency of the rotor to shift to a magnetic center position to move the rotor catch surface out of engagement with the locking pawl. The pawl allows the rotor to rotate one way in the design direction at all axial positions of the rotor so that the motor is readily started in the design direction. After the initial start-up rotation, the catch surface on the rotor is drawn out of reach of the pawl so that wear of these elements and noise generation is avoided during regular operation of the motor.

DESCRIPTION OF THE PREFERRED EMBODIMENT

Figure 1:
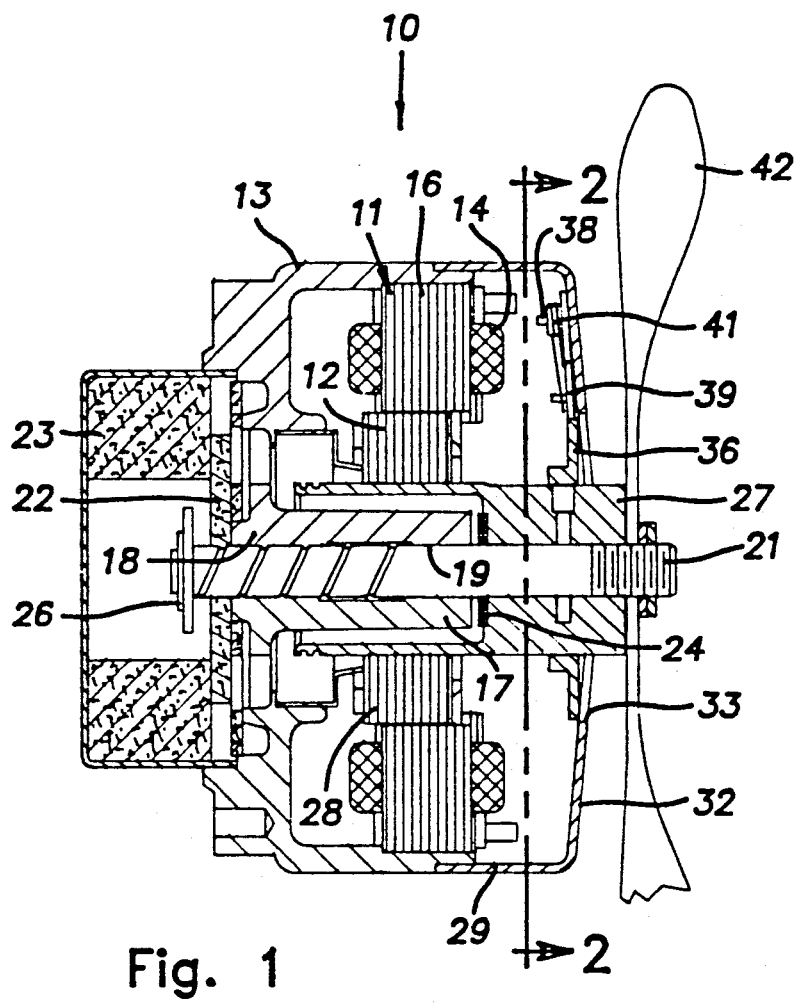
FIG. 1 is a cross-sectional view of an electric motor, taken in the plane through its longitudinal axis, embodying the invention and depicted in a non-operating position.

Referring now to the drawings, there is illustrated an electric motor 10 which in the illustrated example is of the single phase permanent split capacitor type. The motor 10 is of generally conventional construction and includes a stator 11 and a rotor 12. The stator has a cast metal housing 13 and an electric field winding 14 in a stack of field laminations 16 in accordance with conventional practice. The motor 10 is of the unit bearing type where the housing 13 includes an integral bearing post 17 that provides cylindrical axially extending bearing surface bores 18, 19. The bearing surface bores 18, 19 provide a mounting or support for a shaft 21 of the rotor 12 for rotation about its longitudinal axis. The shaft 21 and bearings 18, 19 are lubricated for extended life by a wick 22 communicating with a lubricant reservoir 23. The shaft 21 is capable of limited axial movement in the bearings 18, 19 and is constrained against excessive movement to the left in FIGS. 1 and 3 by a thrust washer 24 and to the right by a thrust washer 26. The rotor 12 includes a hub 27 rigidly fixed to the shaft 21. A stack of annular laminations 28 are fixed on the hub 27. A cup-shaped sheet metal cover 29 forms part of the motor housing 13 to enclose the field winding 14 and or rotor 12. A sidewall 31 of the cover 29 is secured to the main part of the housing 13. An end wall 32 of the cover 29 has an aperture 33 through which the rotor hub 27 and shaft 21 extends.

Figure 2:
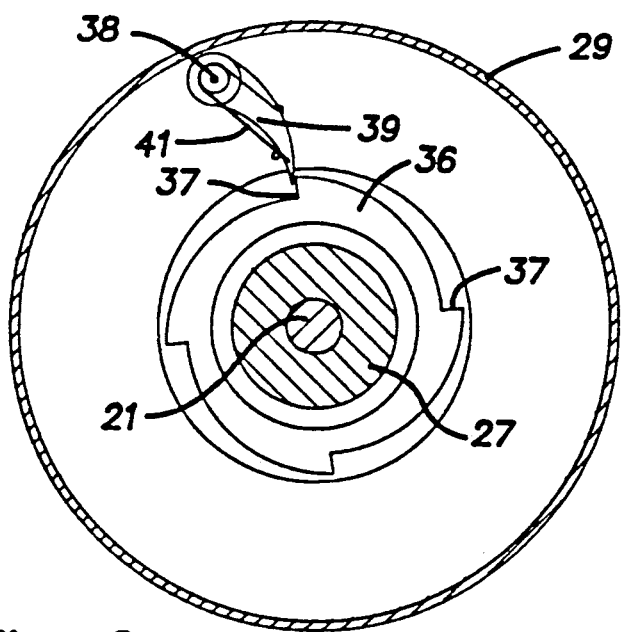
FIG. 2 is a cross-sectional view of the motor taken in the 2—2 indicated in FIG. 1.

A circular ratchet wheel 36 formed, for example, as a steel stamping, is rigidly fixed on the rotor hub 27 in an area just inside of the cover end wall 29. As shown in FIG. 2, the ratchet wheel 36 provides a series of spaced catch surfaces 37 or notches uniformally spaced about its periphery. Pivotally mounted on a pin 38 inside of the cover 29 is a pawl element 39. The pawl 39 is biased by a spring 41 radially with respect to the axis of the shaft 21 towards the ratchet wheel 36.

In the axial position of the shaft 21 illustrated in FIG. 1, the ratchet wheel 36 is in the radial plane (with reference to the axis of the shaft 21) of the pawl 39 so that the pawl is adapted to drop into engagement with one of the notches 37. When received in a notch 37, the pawl 39 prevents rotation of the shaft 21 in a direction opposite of the design direction of the motor 10. In the illustrated case, the motor 10 is designed to start and run in the clockwise direction when viewed in FIG. 2 and the pawl 39 and ratchet wheel 36 are arranged to prevent rotation in the opposite or counter-clockwise direction as viewed in FIG. 2.

Figure 3:
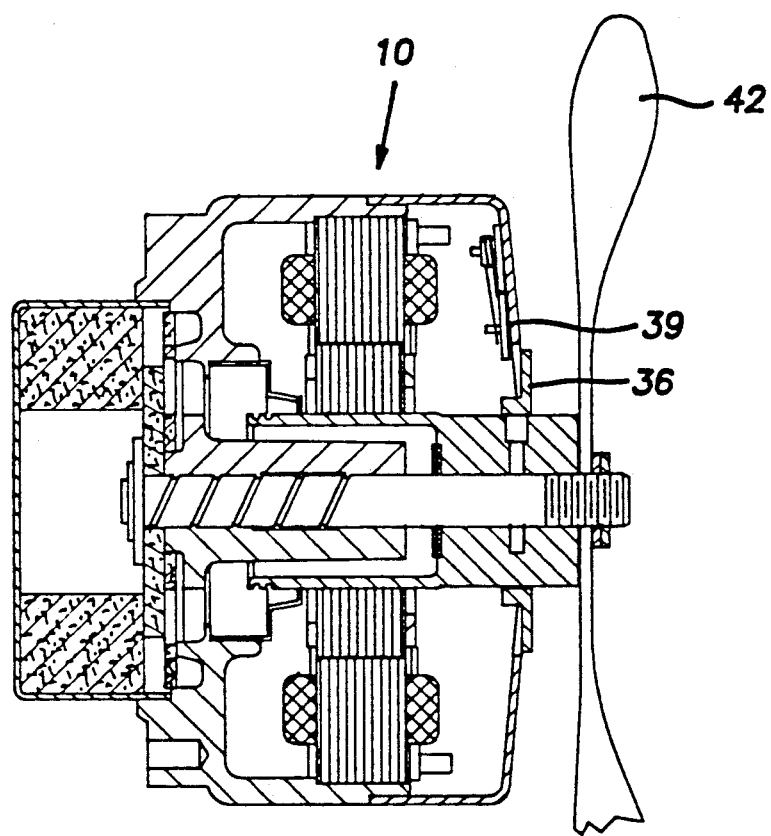
FIG. 3 is a view similar to FIG. 1 showing the motor in an operating position.

When the field winding 14 is electrically energized to rotate the rotor 12, a magnetic centering force is created that axially shifts the rotor 12 from the position illustrated in FIG. 1 to that illustrated in FIG. 3. The magnetic centering force is typically much greater than the external loads on the rotor tending to axially shift or bias it. In this magnetically centered axial position of the rotor, the radial plane of the ratchet wheel 36 is axially shifted from the radial plane of the pawl 39. Consequently, there is no restriction of shaft rotation imposed by the pawl 39 and there is no noise or wear between the pawl and ratchet wheel.

Where an external load on the motor shaft 21 is a fan 42, for example, there are circumstances where the rotor 12 can be back driven in a windmill mode by the load, when the motor is not electrically energized, in a rotary direction opposite the design or preferred rotational direction of the motor. For example, a draft caused by natural air currents or by a back wash of air from an adjacent operating fan can cause the fan 42 and rotor 12 to rotate or windmill in a direction opposite the design direction. The air force on the fan 42 or other external load will cause the rotor 12 to assume the axial position illustrated in FIG. 1. In this position, as previously explained, the pawl 39 prevents the rotor 12 from rotating in the "wrong" direction opposite that of the design direction. This anti-rotation or anti-windmilling function is important because certain electric motor types, such as the disclosed permanent split capacitor motor 10 represented in the Figures tend to continue to rotate in the direction they are rotating when they are electrically energized. Without the disclosed anti-rotation construction provided by the pawl 39 and circular ratchet wheel 36, a motor can operate detrimentally in the wrong direction.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. An electric motor having a stator, a rotor, means rotationally supporting the rotor for rotation With respect to the stator, the stator and rotor being constructed with an electrically energizable winding, said winding causing rotation of the rotor relative to the stator in a design direction when electrically energized and causing the rotor to seek a centered position along its axis of rotation by magnetic force, the rotor including means for rotationally driving a load, said supporting means permitting limited axial motion of the rotor relative to the stator, said supporting means allowing magnetic force applied to the rotor to axially move the rotor to said centered position when the winding is energized and allowing the rotor to move axially to a second position when the winding is not energized, and means to prevent rotation of the rotor opposite to the design direction by external forces associated with the load when the rotor is in the second position.

2. A motor set forth in claim 1, wherein the rotation preventing means comprises a spring loaded pawl.

3. An electric motor comprising as components a stator and a rotor, means rotatably supporting the rotor for rotation about an axis relative to the stator and allowing limited axial end play of the rotor relative to the stator, an electrical winding on one of the stator and rotor components arranged to cause rotation of the rotor relative to the stator in a design direction and to cause the rotor to seek a magnetic center between limits of its axial end play when electrically energized, a one-way anti-rotation element on one of said components, a catch surface on the other of said components, said element and surface being constructed and arranged such that said element engages said surface to prevent rotation of said rotor in a direction opposite said design direction while allowing rotation in said design direction when said rotor is axially displaced from said magnetic center and such that said catch surface is axially displaced from and unaffected by said element when said rotor is in its magnetic center position.

4. A motor as set forth in claim 3, which is of a single phase permanent split capacitor type.

5. A motor a set forth claim 3, wherein said anti-rotation element is mounted in on said stator component.

6. A motor as set forth in claim 5, wherein said anti-rotation element is a pawl pivotally mounted relative to said stator component.

7. A motor as set forth in claim 6, wherein said catch surface is on said rotor component and is in the form of a series of notches circumferentially spaced about the axis of said rotor component.

* * * * *